3,407,820
TOBACCO SMOKE FILTERS

David T. Westcott, Easton-in-Gordano, near Bristol, and Martin L. Reynolds, Bristol, England, assignors to The Imperial Tobacco Company (of Great Britain and Ireland), Limited, Bristol, England, a company of England
No Drawing. Filed Feb. 3, 1966, Ser. No. 524,853
Claims priority, application Great Britain, Feb. 3, 1965, 4,797/65
2 Claims. (Cl. 131—10.9)

ABSTRACT OF THE DISCLOSURE

A tobacco smoke filter containing manganese (IV) oxide dihydroxide for the purpose of removing nitrogen oxides from the smoke.

---

This invention relates to filters for tobacco smoke that is to say the stubs of paper, cotton wool, charcoal cellulose acetate, tobacco or similar filtering materials which are frequently provided at the mouth end of a cigarette, cigar/or tobacco pipe to filter out undesirable constituents in the smoke.

It is thought that oxides of nitrogen in the tobacco smoke in particular nitric oxide, NO and nitrogen dioxide, $NO_2$, are harmful, and it is an object of the present invention to provide a filter that shall to a large extent eliminate such oxides. The conventional filter materials mentioned above are ineffective in this respect.

According to the present invention there is provided a filter for tobacco smoke including an hydrous oxide of manganese (IV).

Preferably the hydrous oxide of manganese has a manganese content of between 48% and 60%. Thus the manganese content may be between 50% and 55%. It has been found that the best material is one having a manganese content of 52.5% i.e. manganese (IV) oxide dihydroxide—$MnO(OH)_2$.

The oxide may be aplied to the filter in granular or powdered condition. Thus it may be added or applied to a plug or stub of filter material.

Alternatively the $MnO(OH)_2$ may be provided in a compartment within the filter either in pure form or mixed with a support or binder. Thus granules of the material may be bound into a solid form with a binder such as plaster of Paris, or the material in granular form may be applied as a loose pocket of grains providing a section of a filter.

When the oxide is applied as a powder it may first be coated on a support such as celite, pumice or carbon.

*Preparation of hydrous oxides of manganese (IV)*

(i) 500 ml. of concentrated hydrochloric acid were slowly added to 1 litre of boiling aqueous solution containing 400 gm. of potassium permanganate. The precipitate was washed with water and dried at 110° for 1 hour.

(ii) Equal volumes of methyl alcohol and potassium permanganate (16 gms./litre) were slowly mixed at room temperature. The resulting precipitate was washed with water and dried at 110° for 1 hour.

(iii) A solution of manganous sulphate tetrahydrate (111 gm.) in water (150 ml.) and sodium hydroxide solution (40% w.v.; 117 ml.) were added simultaneously, during 1 hour with stirring to a hot solution of potassium permanganate in water (600 ml.). The suspension was stirred for 1 hour, filtered, washed with water and dried at 110° C. for 1 hour.

These three methods resulted in the preparation of a granular hydrous oxide of manganese (IV) having a manganese content of 53% i.e. substantially pure $MnO(OH)_2$.

In this specification where the expression "granular form" is used it means grains that will not pass through a 200 B.S. Mesh sieve i.e. above 70 microns while powder means particles of less than 70 microns.

*Applications of material to tobacco smoke filters*

(a) According to one method of applying the $MnO(OH)_2$ granules so prepared to a filter for cigarettes, a filter rod was prepared that included spaced gaps or pockets between filter material. These pockets were filled with the loose grains, thus providing a filter for securing to cigarettes which comprised a stub of filter material, a pocket of grains of $MnO(OH)_2$, and another stub of filter material in that order. The filter was found to retain 60% of the NO and $NO_2$ passing therethrough from a cigarette.

(b) In another method of applying $MnO(OH)_2$ to a filter of a cigarette, grains of the material were bound with 5%–20% plaster of Paris, extruded, set and broken into lumps. The granular material was then added to a chamber as in (a). The granular material was preferable to that of Example (a) since it was harder. The resulting filter absorbed 60% of the NO and $NO_2$ passing therethrough.

(c) Granular $MnO(OH)_2$ was powdered and mixed with a support of charcoal, celite, pumice or carbon. Shaking the powdered $MnO(OH)_2$ with granular carbon and adding the mixture to a compartment in a cigarette filter provided a filter which retained 42% of the NO and $NO_2$ in the tobacco smoke passing therethrough.

(d) $MnO(OH)_2$ was deposited on a support of charcoal, silica gel or sand during its manufacture by placing the support in the aqueous solution of method (i) above before addition of the acid. Upon completing the method, the $MnO(OH)_2$ was deposited on the carrier or support The granular support provided with the deposited $MnO(OH)_2$ was then added to a filter compartment of a cigarette, 38% of NO and $NO_2$ passing therethrough was retained by a filter in which $MnO(OH)_2$ was deposited on carbon, and 30% was retained with an 8% deposit on sand.

(e) Powdered or granular $MnO(OH)_2$ in pure form or added to a support was added to cellulose acetate or paper filters so as to become mixed with the filter paper or fibres. The acetate or paper was then formed into a filter rod and cigarette filters cut therefrom. Such filters removed 35%/45% of the NO and $NO_2$ passing therethrough.

In general, any manner of adding $MnO(OH)_2$ to a tobacco smoke filter may be used provided the $MnO(OH)_2$ is so disposed in the prepared filter as to remove by chemisorption the NO and $NO_2$ in the tobacco smoke.

Thus, whereas known filter materials such as acetate tow, charcoal, paper etc., are completely ineffective in removing oxides of nitrogen from tobacco smoke, the present invention provides a filter which can remove up to 60% of these oxides from the smoke.

What is claimed is:

1. The combination with a smoker's article having a smoke passage therein of a tobacco smoke filter containing manganese (IV) oxide dihydroxide.

2. The combination of claim 1 with a cigarette.

References Cited

UNITED STATES PATENTS 1,893,372    1/1933    Kryzanowsky.

FOREIGN PATENTS 685,822    1/1953    Great Britain.
834,854    5/1960    Great Britain.

LUCIE H. LAUDENSLAGER, *Primary Examiner.*